United States Patent
Klein

(10) Patent No.: US 11,981,572 B1
(45) Date of Patent: May 14, 2024

(54) METHOD FOR WATER-EFFICIENT PRODUCTION OF GRAPHITE FROM PAPER

(71) Applicant: Nippon Kornmeyer Carbon Group GmbH, Windhagen (DE)

(72) Inventor: David Klein, Hennef (DE)

(73) Assignee: Nippon Kornmeyer Carbon Group GmbH, Windhagen (DE)

( * ) Notice: Subject to any disclaimer, the term of this patent is extended or adjusted under 35 U.S.C. 154(b) by 0 days.

(21) Appl. No.: 18/494,811

(22) Filed: Oct. 26, 2023

(30) Foreign Application Priority Data

Oct. 28, 2022 (WO) .................. PCT/EP2022/080232

(51) Int. Cl.
*C01B 32/205* (2017.01)

(52) U.S. Cl.
CPC .................................. *C01B 32/205* (2017.08)

(58) Field of Classification Search
CPC .................................................. C01B 32/205
See application file for complete search history.

(56) References Cited

U.S. PATENT DOCUMENTS

2022/0162073 A1   5/2022   Ito et al.

FOREIGN PATENT DOCUMENTS

| CN | 109437192 A | 3/2019 |
| CN | 110902675 A | 3/2020 |
| DE | 1113214 B | 8/1961 |
| DE | 69105668 T | 4/1995 |
| JP | 2016179923 A | 10/2016 |

*Primary Examiner* — Richard M Rump
(74) *Attorney, Agent, or Firm* — Smartpat PLC

(57) ABSTRACT

A method for water-efficient production of graphite of low density from paper includes steeping paper in a vessel in dimethyl sulfoxide to generate paper fibers, admixing polyacrylonitrile to the dissolved the paper fibers with stirring until formation of a paste or a mixture with pastelike consistency, introducing the paste into a mold and subsequently forcing excess liquid from the paste by pressing, to form a presscake, immersing the presscake subsequently in water for curing the polyacrylonitrile for a specified time, until polymerization of the polyacrylonitrile and formation of a cured presscake, initially drying the cured presscake in air at relatively high temperature up to 100° C., heating up the cured presscake for stabilization in air up to 250° C. to remove the residual moisture, and carbonizing the cured and dried presscake in an oven at >1000° C. and then graphitizing it at >2000° C. to give a low-density graphite block.

4 Claims, 2 Drawing Sheets

METHOD FOR WATER-EFFICIENT PRODUCTION OF GRAPHITE FROM PAPER

TECHNICAL FIELD

The disclosure relates to a method for water-efficient production of graphite of low density from paper, preferably waste paper, for use as insulating material.

BACKGROUND

The very large quantities in which wastepaper arises suggest not only its recycling but also its use for producing graphite for a wide variety of different applications.

SUMMARY

An object of the disclosure is to create a cost-effective, simple, and sustainable method for producing graphite of low density from paper, preferably waste paper, that can also be used as insulating material, and with which the use of water can be reduced to a minimum.

The object is achieved by
steeping paper/waste paper, paper shreds or paper strips in a suitable vessel in dimethyl sulfoxide (DMSO) until the paper has dissolved into fibers,
admixing polyacrylonitrile (PAN) to the paper fibers dissolved in dimethyl sulfoxide with stirring until formation of a paste or a mixture of pastelike consistency,
introducing the paste into a suitable mold and subsequently forcing excess liquid out of the paste by pressing, or subjecting the paste to isostatic pressing, to form a presscake,
thereafter withdrawing the presscake from the mold for curing the polyacrylonitrile and immersing it for a specified time in water until polymerization of the polyacrylonitrile and formation of a cured presscake,
initially drying the cured presscake in air at relatively high temperature up to 100° C.,
heating up the cured presscake for stabilization in air up to 250° C. to remove the residual moisture,
carbonizing the cured and dried presscake in an oven at >1000° C. and then graphitizing it at >2000° C. (up to a maximum of 3000° C.) to give a low-density graphite block.

The preferred temperature for graphitizing is 2500° C., with the high-temperature treatment being performed generally in the absence of air, under reduced pressure or under protective gas.

With this method, there is no need to use an additional binder such as sugar, syrup or starch, and this, along with the extremely low water demand, make this method a particularly cost-effective one for producing graphite of low density that can be used effectively as insulating material or otherwise.

The only disadvantage of this method may be seen as being that the curing/polymerization of the polyacrylonitrile can take up to two weeks; in mass production, however, this can be straightforwardly accommodated.

The invention is to be illustrated in more detail below with a working example.

DETAILED DESCRIPTION

Figure 1:
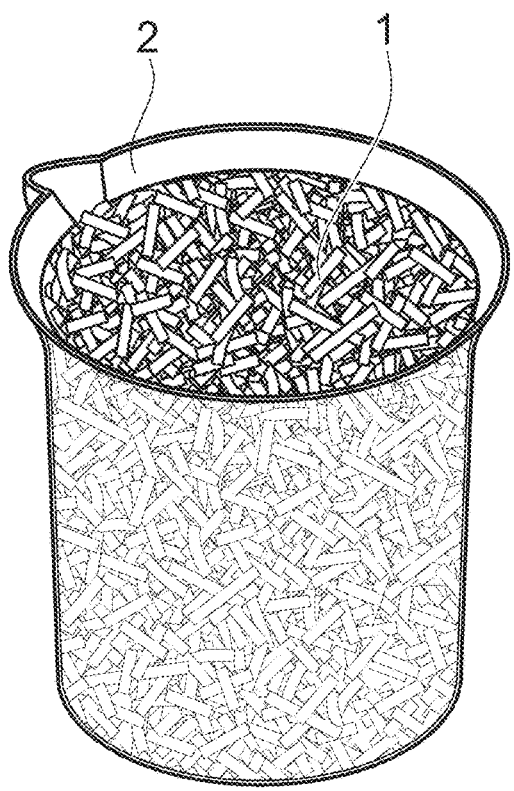
FIG. 1 shows paper shreds in a vessel during dissolution into fibers.

To be able to produce graphite from paper/waste paper, paper shreds or paper strips 1, they are first steeped in a suitable vessel 2 over a prolonged period in dimethyl sulfoxide (DMSO) until the paper 1 has dissolved into fibers (FIG. 1). This process may well take several days.

Figure 2:
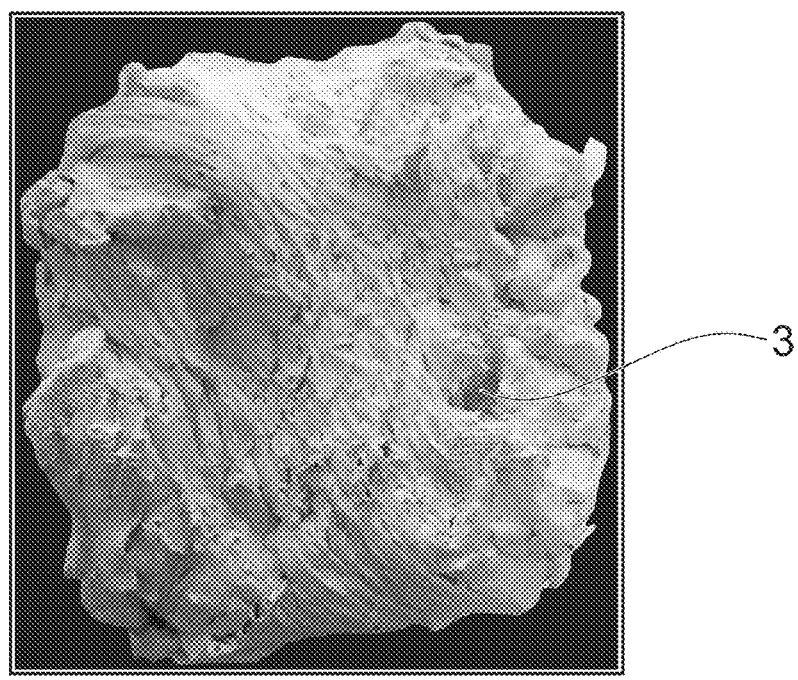
FIG. 2 shows the dissolved paper mixed with a binder with pastelike consistency.

The paper fibers steeped in dimethyl sulfoxide are thereafter introduced into a suitable mixing apparatus and mixed therein and at the same time polyacrylonitrile (PAN) is admixed with stirring until formation of a paste 3 or a mixture with pastelike consistency (FIG. 2).

Figure 3:
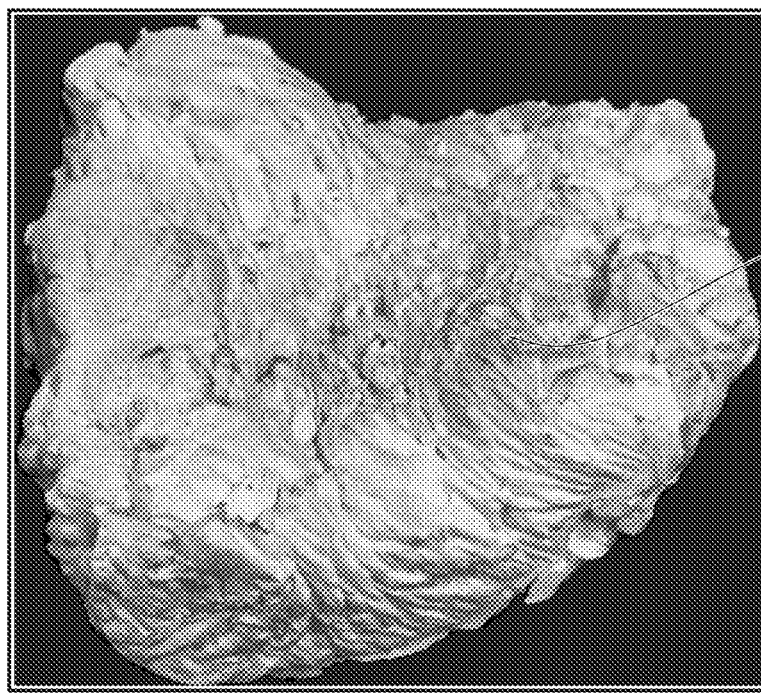
FIG. 3 shows the mixture of FIG. 2 after an isostatic pressing process and curing thereof.
Figure 4:
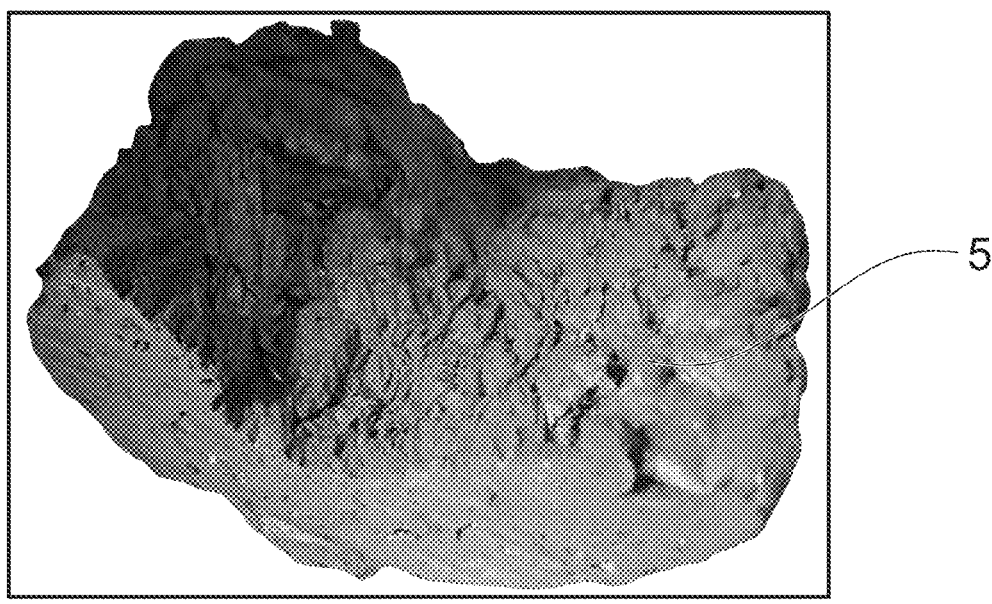
FIG. 4 shows the cured presscake after graphitization.

In a subsequent step, the paste 3 is introduced into a suitable mold and subsequently excess liquid is forced out of the paste by pressing, or the paste is subjected to isostatic pressing, to give a presscake 4 (FIG. 3).

The presscake 4 is thereafter withdrawn from the pressing apparatus and for curing of the polyacrylonitrile it is immersed completely in water for a specified time until polymerization of the polyacrylonitrile and formation of a cured presscake 4, which is first dried in air. The process of the curing/polymerization of the polyacrylonitrile in the presscake 4 may take up to two weeks; in mass production, however, this can be straightforwardly accommodated.

This process of the polymerization of the polyacrylonitrile is the only operating step in which a comparatively small amount of water is used; the water may also be used multiple times. The use of water can therefore be reduced to a minimum.

Since the later carbonizing/graphitizing of the cured presscake 4 is performed at very high temperatures, there is a risk, owing to the solvent used and to the water for curing the presscake 4, of release of gases and vapors which may subsequently result in more or less pronounced cracking in the end product. For this reason, the cured presscake 4, initially dried in air and cured, is heated over a prolonged period in an oven by slow heating for stabilization in an air atmosphere to 250° C. in order to remove remaining solvent and moisture from the presscake 4, as far as possible completely.

The cured and dried presscake 4 is thereafter carbonized in an oven at >1000° C. and then graphitized at >2000° C. (up to a maximum of 3000° C.) to give a low-density graphite block 5, the preferred graphitizing temperature being around 2500° C.

It will be appreciated that the high-temperature treatment has to take place in the absence of air, under reduced pressure or under protective gas.

The particular advantage of this method is to be seen in the lack of requirement to use binders such as sugar, syrup or starch with this method.

Water is needed only in small quantities and only for curing the polyacrylonitrile; this, along with the extremely low water demand, makes the method a particularly cost-effective one for producing graphite of low density that can be used effectively as insulating material or otherwise.

LIST OF REFERENCE NUMERALS 1 paper/waste paper, paper shreds or paper strips
2 vessel 3 paste
4 presscake
5 graphite block

The invention claimed is:

1. A method for water-efficient production of graphite of low density from paper, comprising:
   steeping paper, paper shreds, or paper strips in a vessel in dimethyl sulfoxide (DMSO) until the paper has dissolved into paper fibers;
   admixing polyacrylonitrile (PAN) to the paper fibers dissolved in dimethyl sulfoxide (DMSO) with stirring until formation of a paste (3);
   introducing the paste (3) into a mold and subsequently forcing excess liquid out of the paste by pressing, or subjecting the paste to isostatic pressing, to form a presscake (4);
   thereafter withdrawing the presscake (4) from the mold for curing the polyacrylonitrile and immersing the presscake (4) for a specified time in water until polymerization of the polyacrylonitrile and formation of a cured presscake (4);
   initially drying the cured presscake (4) in air at a temperature up to 100° C.,
   heating up the cured presscake (4) for stabilization in air up to 250° C. to remove residual moisture,
   carbonizing the cured and dried presscake (4) in an oven at >1000° C. to form a carbonized presscake; and then
   graphitizing the carbonized presscake at >2000° C. to produce a low-density graphite block (5).

2. The method as claimed in claim 1,
   wherein the carbonized presscake is graphitized at 2500° C.

3. The method as claimed in claim 1,
   wherein the graphitizing of the carbonized presscake is performed in an absence of air, under reduced pressure, or under protective gas.

4. The method as claimed in claim 1, further comprising:
   using the graphite as an insulating material.

* * * * *